United States Patent
Dubitsky et al.

(10) Patent No.: US 10,746,312 B2
(45) Date of Patent: Aug. 18, 2020

(54) SINGLE FILL VALVE

(71) Applicant: CANDELA CORPORATION, Wayland, MA (US)

(72) Inventors: Dima Dubitsky, Natick, MA (US); Michael Barenboym, Boston, MA (US); Owen Schirduan, Franklin, MA (US)

(73) Assignee: CANDELA CORPORATION, Wayland, MA (US)

( * ) Notice: Subject to any disclaimer, the term of this patent is extended or adjusted under 35 U.S.C. 154(b) by 0 days.

(21) Appl. No.: 16/125,825

(22) Filed: Sep. 10, 2018

(65) Prior Publication Data

US 2020/0080655 A1    Mar. 12, 2020

(51) Int. Cl.
- *F16K 17/04* (2006.01)
- *F16K 17/40* (2006.01)
- *F16K 1/14* (2006.01)

(52) U.S. Cl.
CPC ............. *F16K 17/40* (2013.01); *F16K 1/14* (2013.01)

(58) Field of Classification Search
CPC .................................. F16K 17/40; F16K 1/14

USPC .................................. 137/540, 539, 68.23
See application file for complete search history.

(56) References Cited

U.S. PATENT DOCUMENTS

| 2,524,052 | A | * | 10/1950 | Grant, Jr. ............... F16L 29/02 137/596 |
| 3,595,445 | A | | 7/1971 | Buford et al. |
| 3,645,291 | A | | 2/1972 | Finney |
| 8,316,873 | B2 | | 11/2012 | Bejhead et al. |
| 8,720,858 | B2 | | 5/2014 | Bottcher et al. |
| 9,605,789 | B2 | | 3/2017 | Wray |
| 9,702,505 | B2 | | 7/2017 | Ames et al. |
| 2016/0053915 | A1 | | 2/2016 | Duca et al. |
| 2016/0186891 | A1 | | 6/2016 | Hopper |
| 2017/0008752 | A1 | | 1/2017 | Tuohey et al. |
| 2017/0014174 | A1 | | 1/2017 | Levine et al. |
| 2017/0354451 | A1 | | 12/2017 | Marin et al. |

* cited by examiner

*Primary Examiner* — P. Macade Nichols

(74) *Attorney, Agent, or Firm* — Manelli Seller PLLC; Edward Stemberger

(57) ABSTRACT

A single fill valve for a cryogenic liquid storage vessel. The valve includes a central opening configured to receive a cryogenic liquid and distal and bottom openings configured to direct cryogenic liquid into the cryogenic liquid storage vessel. The valve further includes a plunger and a pin configured to move the plunger and block at least the distal and bottom openings of the single use valve.

8 Claims, 3 Drawing Sheets

SINGLE FILL VALVE

TECHNOLOGY FIELD

This invention relates to a valve for use with vessels that store and dispense liquids. More specifically, this invention relates to vessels that store and dispense cryogenic liquids for use in medical and cosmetics applications. The single fill valve is intended to prevent refilling of the storage vessel after a first fill of the vessel.

BACKGROUND

Many aesthetic and medical skin treatments heat the skin to a temperature that can cause damage to the skin. Frequently, for added protection, skin treatment systems include vessels filled with a substance that could be used as a skin cooling material. The skin cooling material can be packed in cartridges, cylinders, canisters and other similar products. Such cylinders or canisters are typically installed by the user and may be removed and replaced by the user, when the skin cooling material in the vessel is depleted.

For example, many of Candela skin treatment systems incorporate a Dynamic Cooling Device (DCD) used to provide skin protection and palliative relief during aesthetic skin treatment procedures. Such systems deposit a user selectable amount of cryogen spray prior to, during, or after the aesthetic skin treatment so as to provide these beneficial effects. Cryogen, a liquefied gas is usually stored in a vessel under pressure so that it can be delivered to the treated skin segment in liquid or gaseous state.

Typically, each of the materials used for skin treatment is a specially formulated and/or certified material. For example, the cryogen content of the vessel has to be maintained at a high level of purity. Impurities could result in any or all of the following: patient irritation, allergy and combustion of impurities during the skin treatment procedure. The impurities could also clog the skin cooling material delivery system and restrict flow of the cooling material degrading efficiency of the cooling required for skin treatment procedure.

In order to ensure and maintain the purity of the specially formulated or certified for skin treatment cryogenic liquid, the vessel itself needs to not impart contaminants to the liquid. Appropriate certification of vessels and cryogenic materials is needed. Additionally, different measures preventing refill of used vessels by noncertified re-fillers could be undertaken.

The price of a non-certified cryogenic liquid is usually lower than the price of the specially formulated and certified cryogenic liquid. Users of cooling systems could be tempted to use these lower cost, non-certified cryogenic liquids, at least some of the time, especially when cryogenic fluid vessels are depleted. Notwithstanding safety issues, this savings in cost is quickly lost when the skin treatment delivery system needs to be replaced because of a clogged skin cooling material delivery system or there is injury to the patient.

Pressurized liquid storage vessels are typically used in apparatuses that require continuous or pulsed supply of cryogenic fluid or gas. Usually, these vessels filled by the cryogenic fluid or gas contain an amount of cryogenic fluid sufficient for multiple discharges and refills. This typically requires the vessel to be associated with a mechanism allowing connecting and disconnecting gas flow between the vessel and the skin treatment apparatuses. Such mechanism could be a valve that supports filling of the vessel by the cryogenic liquid and discharge of the cryogenic liquid from the vessel. Typically the valve operates in an open state when mounted to the apparatus, and closed state when dismounted from the apparatus. The valve is typically designed to allow many mounts and dismounts to the apparatus. A second value further downstream is used to precisely meter and time the discharge of liquid to skin during laser delivery procedures.

Typically, the vessels or canisters and valves associated with them are designed and manufactured for multiple canister refilling cycles. Accordingly, the valves are designed and manufactured, to permit a user to disconnect the canister from the apparatus for refilling, and reconnect when necessary. As explained above such refilling of vessels is not acceptable for skin treatment applications since delivery of non-certified cryogenic liquid cannot be avoided and can cause damage to the patient and/or apparatus.

There is therefore a need for disposable pressurized gas vessels and in particular, valves which are intended for a single fill of a canister used in a skin treatment apparatus.

Applicants believe that the following US patents and patent Applications reflect the current state of the art: U.S. Pat. No. 3,595,445 to Buford et al., U.S. Pat. No. 3,645,291 to Finney, U.S. Pat. No. 8,316,873 to Bejhead et al., U.S. Pat. No. 8,720,858 to Bottcher et al., U.S. Pat. No. 9,605,789 to Wray, U.S. Pat. No. 9,702,505 to Ames et al., US 20160053915 to Duca et al., US 20160186891 to Hopper, US 20170008752 to Tuohey et al., US 20170354451 to Marin et al. and US20170014174 to Levine et al.

Glossary

As used in the present document the terms "vessel", "cylinder" and "canister", have the same meaning, are used interchangeably and designate objects capable of storing a liquid and in particular a cryogenic liquid.

The term "skin treatment system" as used in the present document includes any skin treatment apparatus including apparatuses for aesthetic skin treatment applying to the skin light energy, radio frequency (RF) energy or ultrasound energy and a combination of the above treatment energies.

The term "valve" as used in the present document includes any apparatus for controlling the flow of liquid into or out of a vessel.

SUMMARY

The present valve is a single fill valve for use with vessels or canisters that store and dispense liquids and in particular cryogenic liquid storage vessels that store and dispense cryogenic liquids for use in medical and cosmetics applications. The cryogenic liquid is used to cool the skin in aesthetic skin treatment procedures. The single fill valve includes a central opening configured to receive a cryogenic liquid and a distal opening configured to direct cryogenic liquid into a cryogenic liquid storage vessel. The single fill valve further includes a plunger and a pin configured to move the plunger, to block at least the distal opening of the single fill valve upon completion of the cryogenic liquid storage vessel being filled with the cryogenic liquid. Blocking of the distal opening of the single use fill valve prevents refilling of the storage vessel with cryogenic other liquid. The single use fill valve includes on one end a coupling arrangement configured to couple to a cryogenic liquid storage vessel and on other end a coupling arrangement configured to couple to a cryogenic liquid filling station or a skin treatment apparatus. The single fill valve also includes some safety features preventing formation of excessive pressure inside the cryogenic liquid storage vessel.

LIST OF FIGURES AND THEIR BRIEF DESCRIPTION

DESCRIPTION

Figure 1:
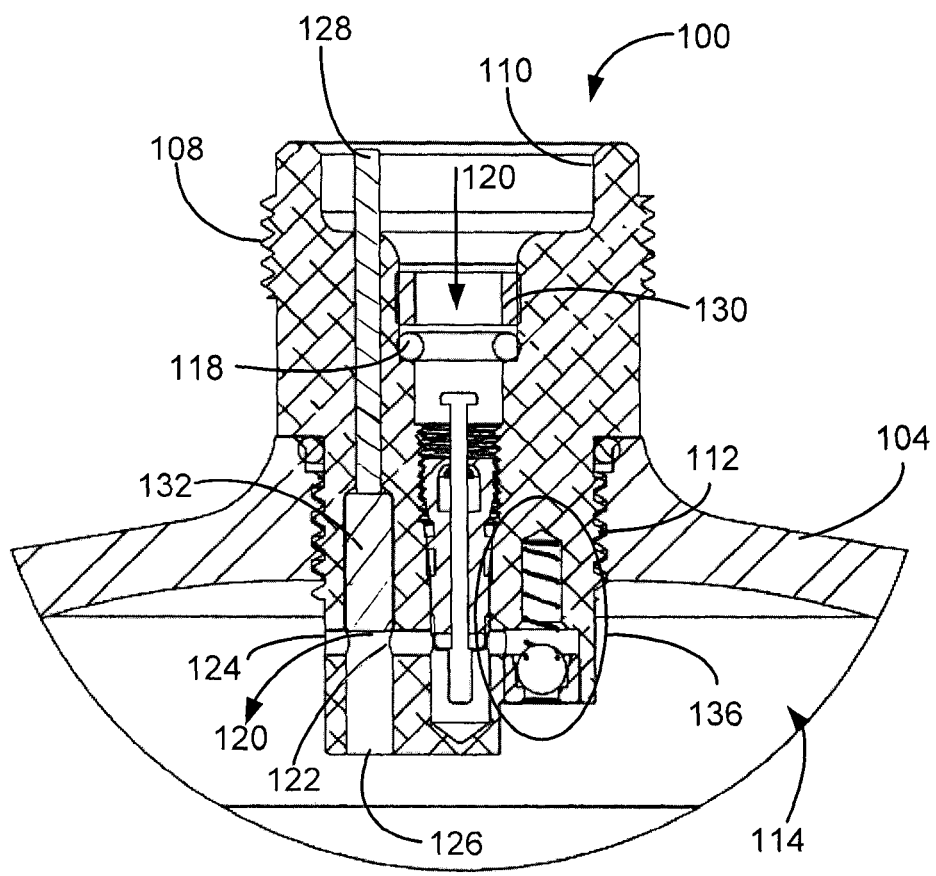
FIG. 1 is a cross section of an example of a single fill valve for a cryogenic liquid storage vessel.

FIG. 1 is a cross section of an example of a single fill valve for a cryogenic liquid storage vessel. Valve 100 is shown attached to a cryogenic liquid storage vessel 104. Valve 100 is a tube-like cylindrical body that includes a proximal end 108 and a distal end 112. Both ends 108 and 112 are terminated by a coupling arrangement. The coupling arrangement could be a thread implemented on outer side of the tube-like cylindrical body.

Threaded segment 108 is located at a proximal end of valve 100 and configured to facilitate connection of single use valve 100 to a cryogenic liquid filling station (not shown). Threaded segment 112 located distal to liquid filling station end of valve 100 facilitates connection of single use valve 100 to a cryogenic liquid storage vessel 104.

When single fill valve 100 coupled with cryogenic liquid storage vessel 104 is connected to a cryogenic liquid filling station or to a skin treatment apparatus, sealing element 118 is pressed by cylindrical insert 130 to support hermetic connection between the valve 100 and the cryogenic liquid filling station or the skin treatment apparatus.

When connected to a cryogenic liquid filling station single use valve 100, allows the liquid or gas 120 to enter the inner space or volume 114 of vessel 104 through normal center fill port 110. Liquid or gas 120 flows from center fill port 110 into liquid storage vessel 104 through a distal side fill port 124 and bottom fill port 126. Pin 128 is in mechanical contact with a plunger 132. During filling of vessel 104 with a cryogenic liquid, inflow passage 122 of side fill port 124 is open allowing the cryogenic liquid or gas to fill vessel 104 via distal side fill port 124 and distal bottom fill port 126. Upon completion of filling vessel 104 with cryogenic liquid filling or other liquid, pin 128 is pushed in the direction of/into the vessel 104. Depressed pin 128, displaces plunger 132 blocking inflow passage 122 preventing liquid or gas 120 from entering liquid storage vessel 104.

Pushing of the pin can be manually done after completion of the cylinder filling, or can be automated, occurring when releasing filled canister from the liquid filling station or when the filled canister is first connected to the tissue treatment system. Manual pushing of the pin can be done using a special tool designed for this purpose, and such tool can be designed into the liquid refilling station vessel coupler so that the pin 128 can be pushed into place prior to disconnecting the coupler from the vessel.

Figure 2:
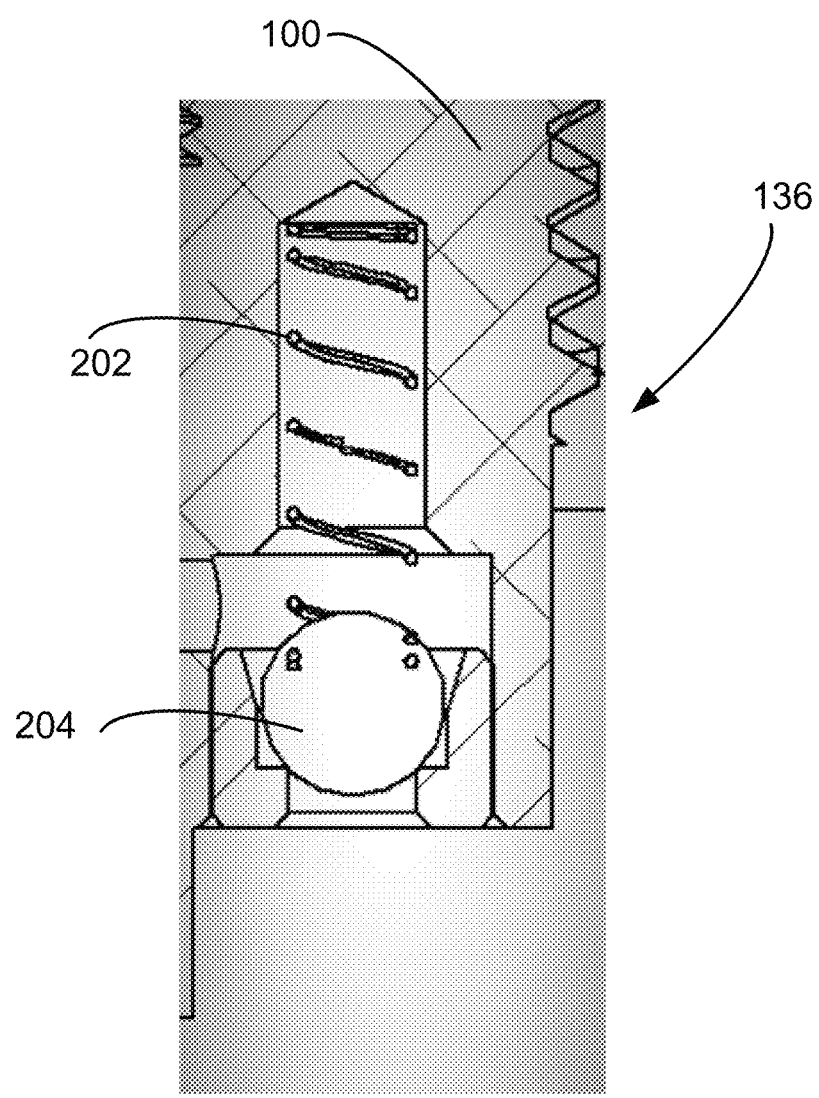
FIG. 2 is an example of a one-way ball valve.

The cryogenic liquid in the cryogenic liquid storage vessel 104 is maintained under pressure such that when cryogenic liquid storage vessel 104 is connected to a skin treatment apparatus and skin treatment is conducted the liquid can be dispensed and cool the treated area of the skin. When single fill valve 100 coupled with cryogenic liquid storage vessel 104 is connected to a skin treatment apparatus cryogenic liquid or gas exits cryogenic liquid storage vessel 104 through a one-way ball valve 136 shown in detail in FIG. 2. Spring 202 maintains the desired position of ball 204. Once the liquid storage vessel is empty, attempts to fill it again through the inflow passage 122 are blocked by plunger 132. The one-way ball valve 136 blocks entrance of cryogenic liquid or gas via the exit path, therefore, not allowing the vessel to be refilled.

Figure 3:
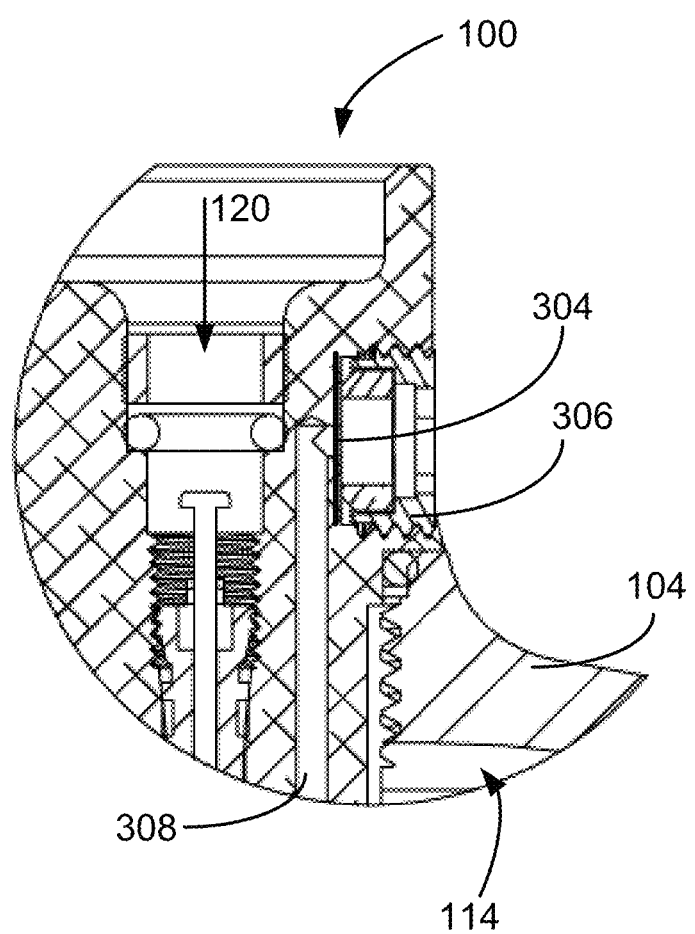
FIG. 3 is an example of a protective over pressure value for releasing over pressured vessels in a safe and controlled manner.

Valve 100 includes some safety features shown in FIG. 3. In case of emergency these features would support safe liquid discharge from the cryogenic liquid storage vessel 104. Burst disk 304, held by nut 306 is a thin (0.05-0.2 mm) diaphragm that acts as a safety pressure release mechanism. Channel 308 communicates with the inner space or volume 114 of vessel 104 and maintains the cryogenic liquid pressure in inner space or volume 114 by applying pressure to burst disk 304. Excessive cryogenic liquid pressure will destroy disk 304 and reduce pressure in the inner space 114.

It will also be appreciated by persons skilled in the art that the present disclosure is not limited to what has been particularly shown and described hereinabove. Rather, the scope of the apparatus includes both combinations and sub-combinations of various features described hereinabove as well as modifications and variations thereof which would occur to a person skilled in the art upon reading the foregoing description and which are not in the prior art.

What is claimed is:

1. A single fill valve for a liquid storage vessel, comprising:
   a tube-like cylindrical body with a proximal and a distal ends with each of the ends terminated by a coupling arrangement;
   a central opening configured to receive a liquid or a gas, the central opening having an inflow passage in communication with a first opening at the distal end and a second opening, in a side wall of the cylindrical body, which communicates with the first opening, the first and second openings being configured to direct the liquid or gas into a cryogenic liquid storage vessel;
   a pin;
   a plunger configured to be moved by the pin to maintain blockage of the inflow passage preventing the liquid or gas from entering the first and second openings and thus the cryogenic liquid storage vessel.

2. The valve according to claim 1 wherein upon completion of cryogenic liquid storage vessel charging of the cryogenic liquid or gas, the plunger is constructed and arranged activated to be moved via the pin to a position to continuously block at least the inflow passage.

3. The valve according to claim 1 wherein the coupling arrangement is a thread.

4. The valve according to claim 1 further including a one way ball valve disposed in a discharge port of the cylindrical body, the one way ball valve being constructed and arranged to facilitate discharge of the cryogenic liquid or gas from the liquid storage vessel through the discharge port and to prevent cryogenic liquid or gas from entering the cryogenic liquid storage vessel via the discharge port.

5. The valve according to claim 1 wherein the valve includes a burst disc and wherein a burst disk acts as a safety pressure release mechanism.

6. The valve according to claim 5 wherein the burst disc communicates with inner space of the vessel.

7. The valve according to claim 5 wherein a cryogenic liquid pressure in inner space of the vessel is applied to the burst disk.

8. The valve according to claim 1, wherein the first opening is transverse with respect to the second opening and the first and second openings communicate at an area that interests with the inflow passage, the plunger being constructed and arranged to be moved to the area to block the inflow passage and thus the first and second openings.

\* \* \* \* \*